United States Patent [19]

Minemura et al.

[11] 4,123,066
[45] Oct. 31, 1978

[54] DEVICE FOR AUTOMATICALLY TURNING DISCS FROM SIDE TO SIDE

[75] Inventors: Hajime Minemura, 1-3-1, Fukasawa, Setagaya-ku, Tokyo, Japan; Haruya Kusama; Shoichi Sato, both of Tokyo, Japan

[73] Assignee: Hajime Minemura, Tokyo, Japan

[21] Appl. No.: 816,923

[22] Filed: Jul. 19, 1977

[51] Int. Cl.² ............................................. G11B 15/00
[52] U.S. Cl. ................................................... 274/10 C
[58] Field of Search ..................................... 274/10 C

[56] References Cited

U.S. PATENT DOCUMENTS

| | | | |
|---|---|---|---|
| 1,741,040 | 12/1929 | Seal et al. | 274/10 C |
| 1,855,125 | 4/1932 | Broeckmeyer | 274/10 C |
| 2,666,649 | 1/1954 | Vanderzee et al. | 274/10 C |

*Primary Examiner*—Harry N. Haroian
*Attorney, Agent, or Firm*—McGlew & Tuttle

[57] ABSTRACT

The device for automatically turning a disc over includes a disc grasping mechanism which comprises a main arm, sub-arms mounted on the main arm to grasp the disc by the circumferential edge with the aid of springs, and electromagnets disposed to control each sub-arm against the action of the springs. The device further includes an automatic mechanism for turning the disc over and which comprises a main rotary shaft connected to the main arm at its middle portion and supported by an anti-friction bearing, a cam means disposed to swing the rotary shaft, a driving shaft with the cam means and a gear fixedly mounted on, the gear being in mesh with another gear fixedly mounted on the main rotary shaft to rotate the latter gear, and a driving motor operatively connected to the driving shaft. The disc grasping mechanism and the automatic mechanism for turning a disc over are interconnected with a full-automatic record player mechanism so that they are operative in an interlocking relation with the record player mechanism.

8 Claims, 14 Drawing Figures

DEVICE FOR AUTOMATICALLY TURNING DISCS FROM SIDE TO SIDE

FIELD AND BACKGROUND OF THE INVENTION

The present invention relates to a device for automatically turning a disc or phonograph record over from one face to the other without manual operation. More particularly, the present invention relates to a device for automatically turning over a disc with which a full-automatic record player mechanism can be operatively interconnected so as to enable a number of discs to be played continuously from one face to the other without any interruption due to manual turning operation.

Hitherto there have been known the socalled full-automatic record players in which the player arm is automatically brought into operation to start playing a disc record and, as soon as the play of one face is over, automatically returned to its starting position. However, the record players of the type do not operate to automatically turn disc records over, and the record turning operation must have been performed by hand.

The turning over of the disc by hand tends to be accompanied by various problems and disadvantages, involving the possibilities that the disc may slip out of the hands even when very carefully handled or that its faces may become hand-stained. Under the circumstances, an automatical disc turning device has long been looked for. However, only conceptive designs have thus far been suggested and propose too large or expensive apparatuses. No practically useful apparatus has been realized.

SUMMARY OF THE INVENTION

Accordingly, it is the object of the present invention to provide a device for automatically turning over a disc which is inexpensive and simple in structure, and which can suitably be combined with the conventional record player.

In order to attain the object according to the invention, there is provided a device for automatically turning over a disc over which is characterized by the combination of:

(a) a disc grasping mechanism comprising a main arm, sub-arms mounted on the main arm to grasp the disc by the circumferential edge with the aid of spring means, and electromagnets disposed to control each sub-arm against the action of the spring means and (b) an automatic mechanism of turning the disc over comprising a main rotary shaft connected to the main arm at its middle portion and supported by a ball-and-roller bearing, a cam means disposed to swing the rotary shaft, a driving shaft with the cam means and a gear fixedly mounted on, the gear being in mesh with another gear fixedly mounted on the main rotary shaft to rotate the latter gear, and a driving motor operatively connected to the driving shaft.

The above and other objects and features of the present invention will be more fully illustrated by the following description taken in connection with the accompanying drawings.

DESCRIPTION OF THE PREFERRED EMBODIMENT

Figure 1:
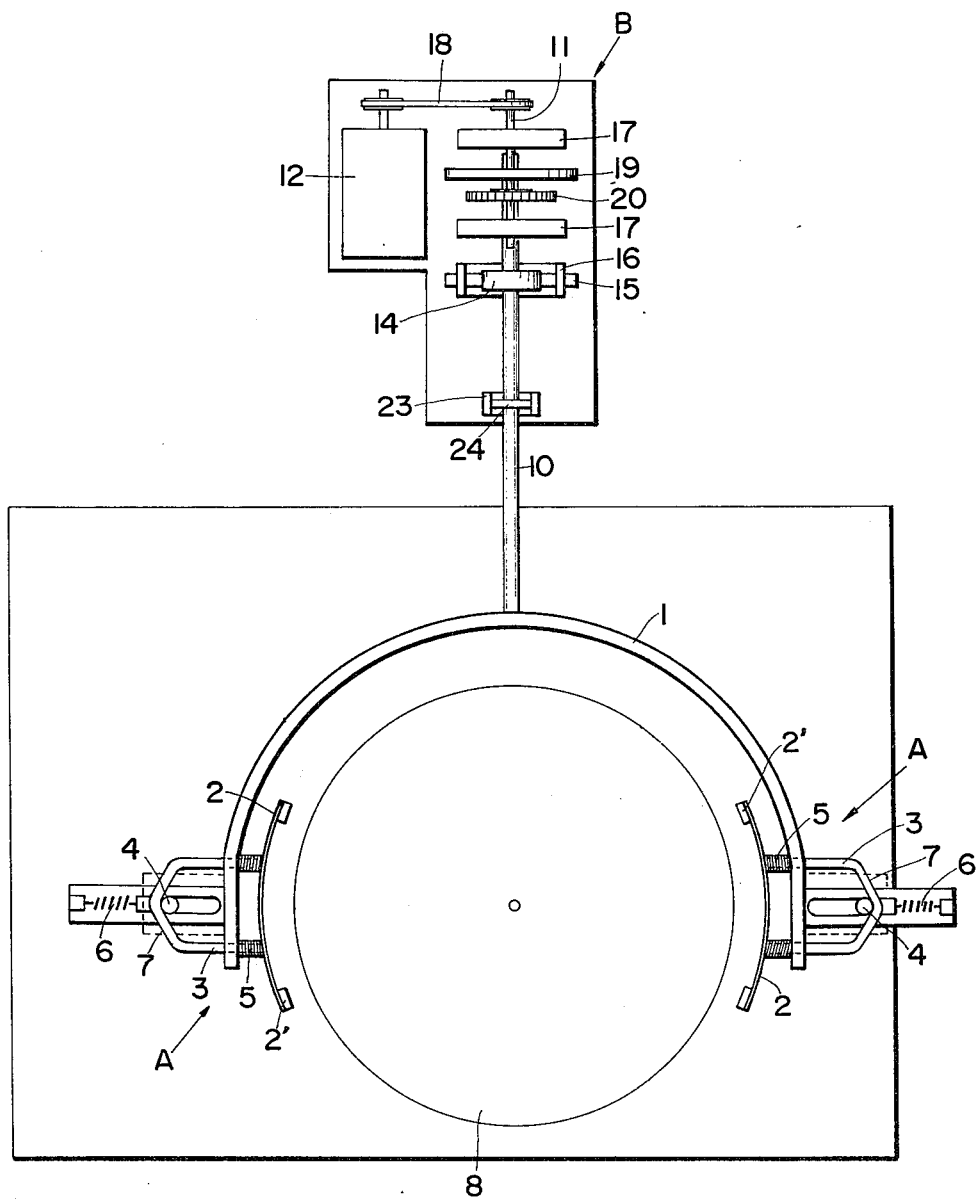
FIG. 1 is a plan view of a preferred embodiment of the present invention.
Figure 2:
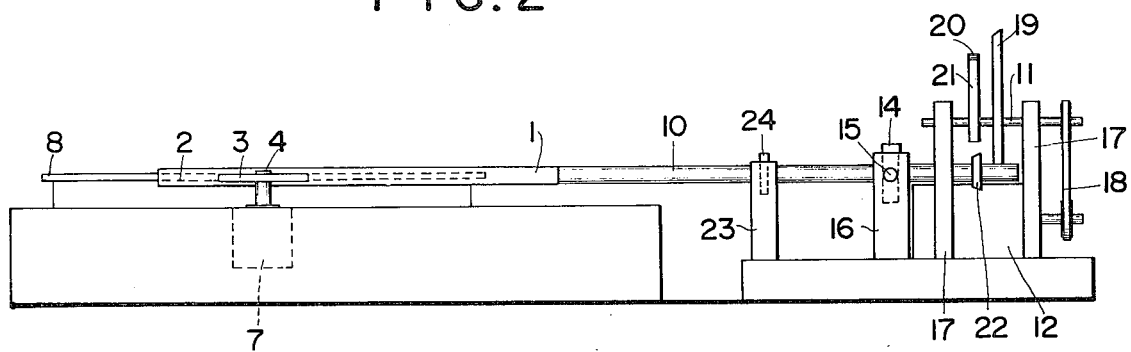
FIG. 2 is a side view thereof.
Figure 3:
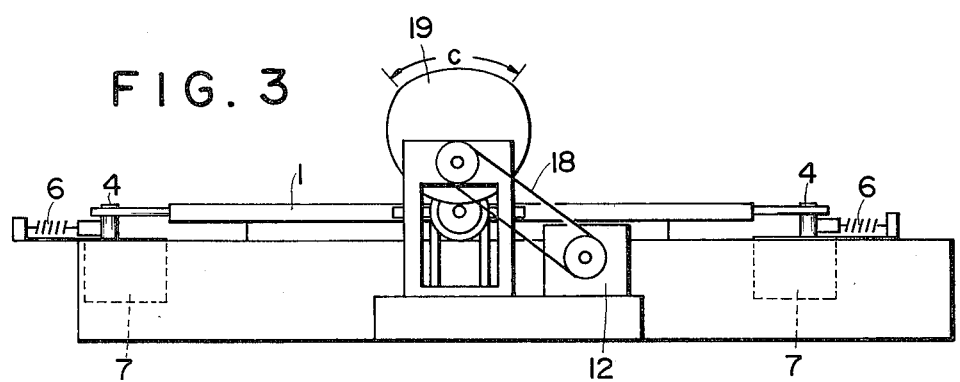
FIG. 3 is a rear view thereof.

Referring to FIGS. 1-3 showing a typical embodiment of the present invention, the device of the invention is composed of a pair of disc grasping mechanisms A and an automatic disc turning mechanism B. The disc grasping mechanisms A are disposed to come into touch with or off the circumference of the disc so that the disc can be held or released, while the automatic disc turning mechanism B serves to move the disc held by the grasping mechanisms upward from the turn table of the record player to a higher position enough to provide a space for the disc to turn over, then effect the turning, and finally to return the turned-over disc onto the turn table.

As is clearly shown in FIG. 1, the pair of units A and A of the grasping mechanism are arranged symmetrically relative to the center pin of the turn table. Each unit A comprises an arcuate main arm 1, a sub-arm 2, an arm holder 3, a stopper 4, first springs 5, a second spring 6 and an electromagnet 7. Each sub-arm 2 has two pawls 2', 2' secured at the opposite ends of the sub-arm, and is disposed on the inner side of one end of the main arm 1 and held by the arm holder 3 which is in turn mounted on the main arm 1 with its leg portions being passed through the main arm, as shown in FIG. 1. Normally, the arm holder 3 is engaged with the stopper 4 disposed at the inner side of the holder. The stopper is always urged outward by the force of the second spring 6. Between the main arm 1 and the sub-arm 2 there are provided the first springs 5. The force $F_5$ of the first springs is smaller than the force $F_6$ of the second spring (that is, $F_6 > F_5$), so that the sub-arm 2 is normally controlled by the second spring 6.

While the stopper 4 is always under the action of the second spring 6 as described above, it is designed that, when the electromagnet 7 is energized, the stopper is allowed to move toward the disc against the force $F_6$ of the spring 6.

In this manner, in the normal position shown in FIG. 1, the disc grasping mechanisms A, A are maintained by the second springs 6, 6 at their retracted position in which the pawls 2' and 2' of each sub-arm 2 are spaced from the circumference of the disc 8 to allow free revolution of the disc. On the other hand, when the electromagnet 7 is energized, its attraction force $F_7$ overcomes the tension force $F_6$ of the second spring 6 (that is, $F_7 > F_6$), and hence the stopper 4 is drawn toward the disc side. This movement of the stopper 4 results in releasing the arm holder 3 from the stopper 4. Now, the holder 3 is subjected to the action of the first springs 5 and moved toward the disc side by the tension of the first springs 5. Consequently, the pawls 2' and 2' on the opposite ends of the sub-arm come into contact with the circumference of the disc to grasp it.

Next, with respect of the sutomatic disc turning over mechanism B, as shown in FIGS. 1 and 2, the mechanism comprises a main rotary shaft 10, a driving shaft 11 and a motor 12. By the driving shaft 11, the main rotary shaft 10 is initially swung to a position inclined to a horizontal plane containing the surface of the turn table, then rotated turn to turn over the disc, and finally returned to the original horizontal position. To this end, the main rotary shaft 10 is supported by a ball-and-roller bearing 14, while its axle or pivot 15 is supported by a column 16 so that the main shaft 10 may be swung around the pivot 15. The fore-end of the main rotary shaft 10 is connected to the main arm 1 of the above-described disc grasping mechanism A at its middle portion, so that the main arm 1 is moved in association with the main rotary shaft 10.

The driving shaft 11 is supported by a pair of columns 17, with its end connected to the motor 12 by way of a belt 18. About at the middle of the driving shaft 11, there are fixedly mounted a cam 19 and a gear plate 21. The cam 19 may have, for example, such a contour as shown in FIG. 3. The gear plate 21 has a gear 20 provided on a portion of its circumferential edge. Thus, with the rotation of the driving shaft 11, the cam 19 causes the main shaft 10 to swing up to a predetermined, inclined position, and when the main shaft has reached the inclined position, the gear plate 21 comes into mesh with a gear 22 mounted on the main shaft to rotate it. To assure this movement of the main shaft, the cam 19 is contoured such that the distance between the driving shaft 11 and the circumferential edge portion of the cam nearest to the shaft has a length just to maintain the main shaft 10 at its horizontal position and the distance between the driving shaft 11 and the remotest circumferential portion has a length just enough to maintain the main shaft 10 at its inclined position. Moreover, the remotest circumferential portion area, that is, the cam surface area C shown in FIG. 3, lies on a circle drawn around the driving shaft 11 as the center. The gear plate 21 has the gear portion 20 only on a limited angular area of circumference of the plate corresponding to the cam surface area C of the cam 19.

Figure 4:
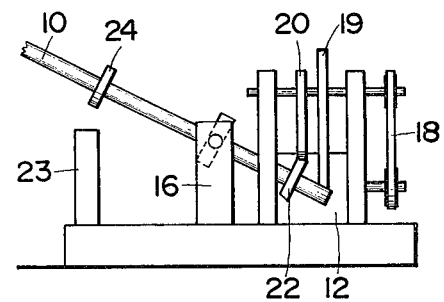
FIG. 4 is a partial side elevation view of a device embodying the invention and showing the position of the automatic disc turning-over mechanism while a disc record is being turned over.

When the motor 12 is started, its rotational movement is transmitted to the driving shaft 11 via the belt 18. With the rotation of the driving shaft 11, the cam 19 and the gear plate 21 are also rotated together so that the main rotary shaft 10 in contact with the cam 19 is brought to its inclined position, swinging gradually around the axis of shaft 15 in the above described manner. When the main rotary shaft 10 comes into contact with the cam surface area C of the cam 19 (see FIG. 4), the swing movement of the shaft 10 ceases and, instead, the gear portion 20 of the gear plate 21 now comes into mesh with the gear 22 on the main shaft to cause a rotational movement of the main shaft 10. When the main shaft 10 has been rotated by just 180°, that is, immediately after the disc 8 grasped by the main arm 1 has been turned over completely, the engagement between the gear plate 20 and the gear 22 is released. Thereafter, the main rotary shaft 10 moves back gradually to its starting, horizontal position through the action of the cam 19. As soon as the main shaft has been returned exactly to its starting position, the motor 12 is stopped.

In the above-described automatic disc turningover mechanism B, it is desired to accurately control the rotation angle of the main rotary shaft 10 exactly to 180°. To this end, the automatic mechanism B is provided with an additional mechanism, that is, an angular correction guide mechanism. This guide mechanism comprises a pair of guide posts 23 secured on the base and a guide member 24 secured on the main rotary shaft 10, as shown in FIGS. 1 and 2. The outer surfaces of the guide member 24 continue contacting with the inner surface of each the guide post 23 during the swing movement of the main shaft so that any unintentional rotational movement of the main shaft 10 may be prevented during its swing movement all over the course. Furthermore, the guide mechanism serves to prevent the main rotary shaft from over-running after it has rotated by just 180° or to prevent the gears from backlashing.

In practicing the device of the present invention, the disc grasping mechanism A and the automatic disc turning-over mechanism B are interconnected to each other to accomplish the interlocking operational motion. For the purpose, there are provided three switches, $SW_1$, $SW_2$ and $SW_3$. $SW_1$ is installed at the arm rest portion of the player arm of the record player to operate with the player arm. $SW_2$ is installed under the main rotary shaft 10 of the turning-over mechanism to be operable with the motion of the main shaft. $SW_3$ is arranged so as to operate with the motion of the stopper 4 of the grasping mechanism.

Figure 5A:
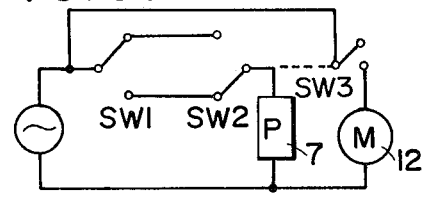
Figure 5B:
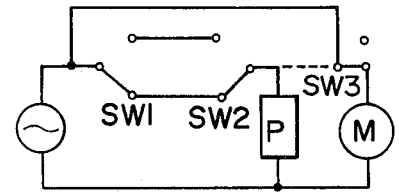
Figure 5C:
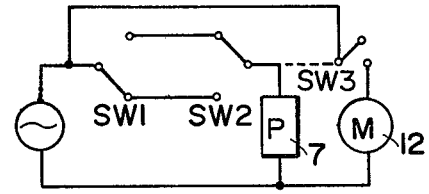

The switches $SW_1$, $SW_2$ and $SW_3$, the electromagnet 7 and the motor 12 of the turning-over mechanism B constitute an electric circuit as shown in FIG. 5. The mode of operation of this circuit will now be described by reference to FIG. 5(a) to FIG. 5(c), each showing the circuit in a different switching position.

Starting from the position shown in FIG. 5 (a), the switch $SW_1$ is actuated to establish the position as shown in FIG. 5(b). This energized the electromagnet 7, thereby to bring the disc-grasping mechanism A into operation so that the circumference of the disc 8 is grasped by the pawls 2' provided on the pair of the sub-arms. On the other hand, the energized electromagnet makes the switch $SW_3$ close as shown in FIG. 5(b) so that the motor 12 is started operating. As a result, an automatic turning-over of the disc is effected. Upon the completion of the turning-over of the disc, the main rotary shaft 10 starts returning to its original horizontal position. When the tip end of the main shaft reaches the horizontal position, it actuates the switch $SW_2$ so that the circuit leading to the electromagnet 7 is opened as shown in FIG. 5(c). The magnet 7 is deenergized which in turn causes the switch $SW_3$ to open, and the motor 12 is also stopped. Thus a cycle of disc turning-over operation comes to end.

Figure 6A:
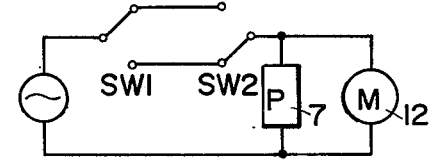
Figure 6B:
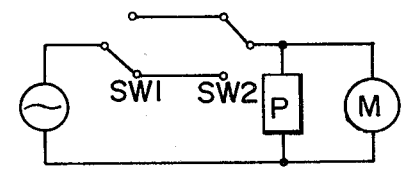
Figure 6C:
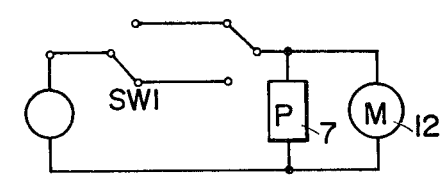

The device of the present invention is also operable employing another electric circuit as shown in FIG. 6. This electric circuit differs from that of FIG. 5 in that the switch $SW_3$ is omitted. Since the electromagnet is generally actuated in an instant, the switch $SW_3$ is not always necessary to operate the electromagnet. However, the circuit of FIG. 5 containing $SW_3$ is superior to that of FIG. 6 in respect of reliability of operation. The provision of the switch $SW_3$ assures that the automatic disc turning-over mechanism B should be brought into operation only when the disc grasping mechanism A has been operated. This serves to accomplish a more accurate operation of the device in a series of different motions.

FIG. 7 shows one example of the circuit which enables to continuously effect an automatic playing of a disc record and an automatic turning over of the disc by incorporating the device of the invention into the known full-automatic record player.

In the drawing of FIG. 7, $SW_4$ designates a main switch (manual) of the full-automatic record player in which the device of the invention is incorporated, and PM is a player driving motor. In this electric circuit, the switch $SW_1$ is set in a manner such that it is actuated with the motion of the player arm returning to the associated arm rest.

Figure 7A:
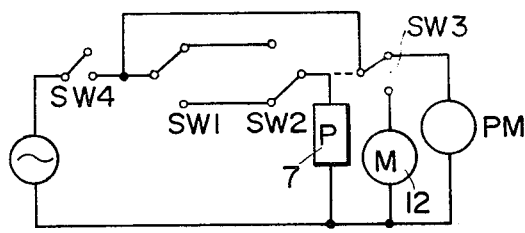
FIGS. 5a through 7d are schematic wiring diagrams illustrating three different embodiments of an electric circuit for use in operating the device of the invention.
Figure 7B:
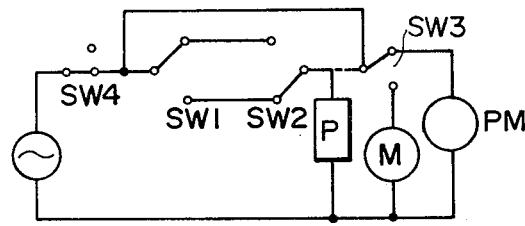
Figure 7C:
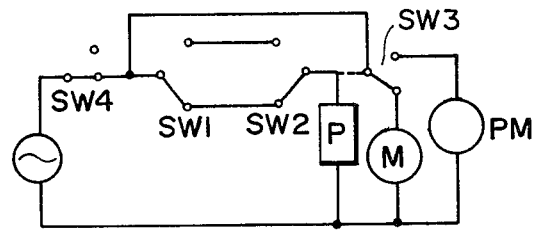
Figure 7D:
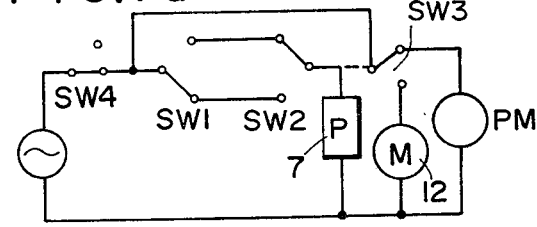

Starting from the rest position shown in FIG. 7(a) where no record playing is performed, the main switch $SW_4$ of the full-automatic record player is actuated. Then, the player driving motor is started as shown in FIG. 7(b) so as to automatically start playing the disc record 8 on the first side surface. Upon the end of playing the first side of the disc 8, the player arm is automatically returned to the arm rest and, thereby, the switch $SW_1$ is closed, as shown in FIG. 7(c). Then, the operational motion for automatically turning the disc over proceeds in the same manner as described above with reference to FIG. 5. After the completion of the operation of turning the disc 8, the main rotary shaft 10 brings the switch $SW_3$ to the position shown in FIG. 7(d). Thereby, the player driving motor is started again to do with the other side surface of the disc 8.

As clearly understood from the foregoing description, the device of the present invention make it possible to turn over a disc very smoothly in a simple manner and with a high accuracy. Therefore, all the problems and troubles, such as breakage of discs and making discs dirty, involved in the conventional, manual turning-over of discs can be effectively prevented by employing the automatic disc turning-over device according to the invention. Moreover, the apparatus of the present invention has the advantage from the standpoint of practical use, that its manufacturing cost is low and it is compact in size.

The reference numerals used in the drawings are: 1 . . . main arm; 2 . . . sub-arm; 2' . . . pawl; 3 . . . arm holder; 4 . . . stopper; 5 . . . first spring; 6 . . . second spring; 7 . . . electromagnet; 8 . . . disc record; 10 . . . main rotary shaft; 11 . . . driving shaft; 12 . . . motor; 14 . . . ball-and-roller bearing; 15 . . . axis; 16,17 . . . column; 18 . . . belt; 19 . . . cam; 20 . . . gear; 21 . . . gear plate; 22 . . . gear; 23 . . . guide post; and 24 . . . guide member.

While specific embodiments of the invention have been shown and described in detail to illustrate the application of the principles of the invention, it should be understood that the invention may be embodied otherwise without departing from such principles.

What is claimed is:

1. A device for automatically turning over a record disc mounted on a turntable rotatable on a base, said device comprising, in combination, an arcuate main arm extending, in an inactive position, partially around a record disc on the turntable and in substantially concentric radially spaced relation to the record disc; respective disc engaging arms slidably mounted on opposite ends of said main arm; respective stop means on said base operatively engageable with said disc engaging arms; respective first spring means biasing said stop means away from the disc to retain the associated disc engaging arms disengaged from the disc; respective second spring means biasing said disc engaging arms toward the disc; the biasing force of said first spring means being greater than that of said second spring means; respective electromagnetic means operable, when energized, to move said stop means, against the bias of said first spring means, toward the disc for engagement of said disc engaging arms, under the bias of said second spring means, with the disc; a main shaft secured to said main arm intermediate the ends thereof and extending radially outwardly therefrom; support means engaging said main shaft intermediate its ends and providing for rotation of said main shaft about its axis and for swinging of said main shaft between said inactive position of said main arm and an active position in which said main shaft extends outwardly at an angle to the horizontal sufficiently large to allow rotation of said main arm in clearing relation with the turntable; a drive shaft; a motor in driving relation with said drive shaft; a cam secured to said drive shaft and engageable with said main shaft, upon rotation of said drive shaft to swing said main shaft to said active position; a first gear on said main shaft; gear means fixed to said drive shaft and engageable with said first first gear, only when said main shaft is in said active position, to rotate said main shaft through exactly 180° responsive to rotation of said drive shaft; said cam, at the end of said rotation of said main shaft, providing for return movement of said main shaft to the inactive position in which said electromagnetic means are deenergized for movement of said disc engaging arms by said stop means under the bias of said first spring means, away from the disc.

2. A device for automatically turning over a record disc, as claimed in claim 1, including respective arm holders slidably mounted on opposite ends of said main arms, and each mounting a respective one of said disc engaging arms; said stop means being engageable with said arm holders.

3. A device for automatically turning over a record disc, as claimed in claim 1, in which said support means comprises an anti-friction bearing engaging said main shaft intermediate its ends; pivot means extending from said anti-friction bearing; and support elements rotatably supporting said pivot means.

4. A device for automatically turning over a record disc, as claimed in claim 1, in which said cam is formed with a circular arc concentric with said drive shaft and maintaining said main shaft in the active position only during the time required for said gear means to rotate said first gear through 180°.

5. A device for automatically turning over a record disc, as claimed in claim 1, including guide means engageable with said main shaft during movement thereof between said inactive and active positions and maintaining said main shaft against rotation during such movement.

6. A device for automatically turning over a record disc, as claimed in claim 1, further comprising a control circuit operatively associated with said electromagnetic means and with said motor; said control circuit including a souce of potential, said electromagnetic means, said motor, and at least a first switch and a second switch; said first switch being connected in series between said source of potential and said electromagnetic means, and being normally open; said first switch being closed responsive to movement of a pickup arm cooperable with the record disc, to a retracted rest position; said second switch being connected between said first switch and said electromagnetic means, and being initially closed and thereafter opened upon return of said main shaft to the inactive position to deenergize said electromagnetic means; said electromagnetic means, when energized, effecting energization of said motor.

7. A device for automatically turning over a record disc, as claimed in claim 6, in which said control circuit includes a third switch connected between said source of potential and said motor, said third switch being normally open and being closed responsive to energization of said electromagnetic means.

8. A device for automatically turning over a record disc, as claimed in claim 7, including a main manually operable switch for the turntable and a second motor for rotating the turntable; said main manually operable switch being interposed between said control circuit and said source of potential; said third switch, in its open position, further acting to complete a circuit for said second motor and which last-named circuit includes said source of potential and said main manually actuated switch.

* * * * *